(12) United States Patent
Gali et al.

(10) Patent No.: US 12,737,239 B1
(45) Date of Patent: Sep. 15, 2026

(54) DYNAMIC DIVERSE DATA AGGREGATION

(71) Applicant: Juniper Networks, Inc., Sunnyvale, CA (US)

(72) Inventors: Shivaprasad Gali, Bangalore (IN); Madhura Mysore Nagaprakash, Mysuru (IN); Cyril Margaria, Dublin (IE)

(73) Assignee: Hewlett Packard Enterprise Development LP, Houston, TX (US)

( * ) Notice: Subject to any disclaimer, the term of this patent is extended or adjusted under 35 U.S.C. 154(b) by 650 days.

(21) Appl. No.: 18/327,470

(22) Filed: Jun. 1, 2023

(51) Int. Cl.
*G06F 9/44* (2018.01)
*G06F 9/54* (2006.01)

(52) U.S. Cl.
CPC .................................... *G06F 9/54* (2013.01)

(58) Field of Classification Search
CPC ........................................................ G06F 9/54
USPC ........................................................ 719/328
See application file for complete search history.

(56) References Cited

U.S. PATENT DOCUMENTS

2016/0301739 A1* 10/2016 Thompson ............ H04L 67/561
2020/0301939 A1* 9/2020 Hollander ........... G06F 16/2471
2023/0027810 A1* 1/2023 Pokorny .................. G06F 8/65

* cited by examiner

*Primary Examiner* — Timothy A Mudrick
(74) *Attorney, Agent, or Firm* — Harrity & Harrity, LLP

(57) ABSTRACT

In some implementations, a system may identify a configuration file that defines an application programming interface (API) aggregation pipeline, wherein the API aggregation pipeline includes a plurality of objects, and wherein each object, of the plurality of objects, identifies at least one of an API action or one or more child objects. The system may receive, based on identifying the configuration file, an API request associated with the API aggregation pipeline. The system may execute, based on the API request, the API aggregation pipeline, wherein executing the API aggregation pipeline includes performing at least one dynamic operation. The system may provide, based on executing the API aggregation pipeline, an API result.

20 Claims, 7 Drawing Sheets

DYNAMIC DIVERSE DATA AGGREGATION

BACKGROUND

An application programming interface (API) is a set of functions that enables interaction or communication between entities (e.g., software programs, devices, and/or systems). For example, an API can be used to send and receive data.

SUMMARY

In some implementations, a method includes identifying, by a system, a configuration file that defines an application programming interface (API) aggregation pipeline, wherein the API aggregation pipeline includes a plurality of objects, and wherein each object, of the plurality of objects, identifies at least one of an API action or one or more child objects; receiving, by the system and based on identifying the configuration file, an API request associated with the API aggregation pipeline; executing, by the system and based on the API request, the API aggregation pipeline, wherein executing the API aggregation pipeline includes performing at least one dynamic operation; and providing, by the system and based on executing the API aggregation pipeline, an API result.

In some implementations, a non-transitory computer-readable medium storing a set of instructions includes one or more instructions that, when executed by one or more processors of a system, cause the system to: receive an API request associated with an API aggregation pipeline defined in a configuration file, wherein the API aggregation pipeline includes a plurality of objects, and wherein each object, of the plurality of objects, identifies at least one of an API action or one or more child objects; execute, based on the API request, the API aggregation pipeline; and provide, based on executing the API aggregation pipeline, an API result.

In some implementations, a system includes one or more memories; and one or more processors to: identify a configuration file that defines an API aggregation pipeline, wherein the API aggregation pipeline includes a plurality of objects; receive, based on identifying the configuration file, an API request associated with the API aggregation pipeline; execute, based on the API request, the API aggregation pipeline, wherein the one or more processors, to execute the API aggregation pipeline, are to perform at least one dynamic operation; and provide, based on executing the API aggregation pipeline, an API result.

DETAILED DESCRIPTION

Figure 1A:
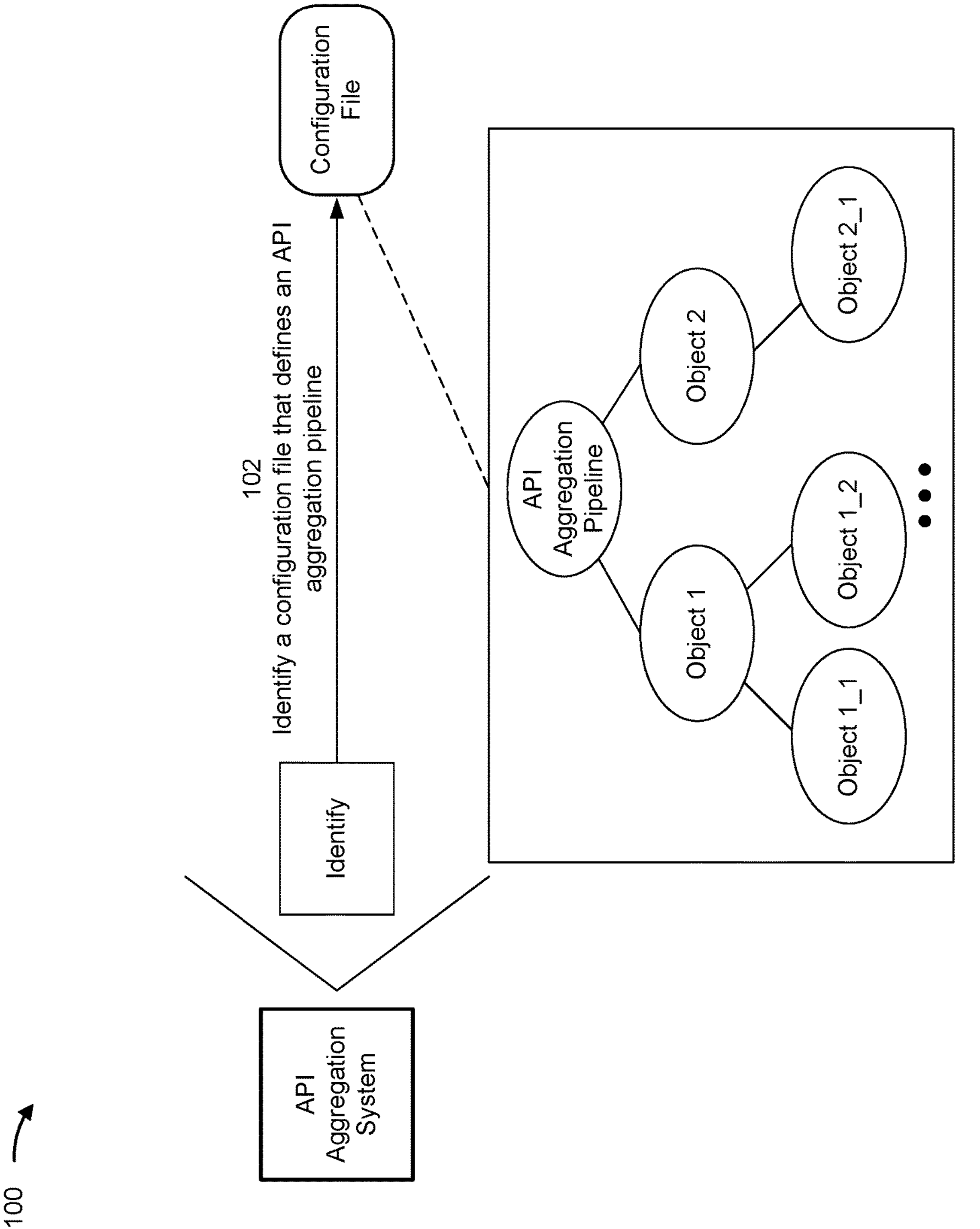
FIGS. 1A-1D are diagrams of an example implementation associated with dynamic diverse data aggregation.

The following detailed description of example implementations refers to the accompanying drawings. The same reference numbers in different drawings may identify the same or similar elements.

A user device can execute multiple application programming interfaces (APIs) to obtain information from multiple data sources. For example, a user device can collect, using APIs, data from different data sources and present the data (e.g., in an aggregated, meaningful way) via a graphical user interface (GUI), such as a dashboard, to a user of the user device. An intermediary API device can be used to manage APIs (also referred to as API endpoints) and perform data transformations on API output to facilitate collecting and providing data. However, the intermediary API device manages static API endpoint requests and data transformations, which often does not provide dynamic flexibility. For example, a user of the user device may need to view and interact with real-time data, but the intermediary API device does not have the necessary API endpoints configured to collect and provide data on the fly, or with minimal latency. In many cases, such as when the user device is monitoring other devices and/or systems, this results in issues, such as issues that are associated with computing resources (e.g., processing resources, memory resources, communication resources, and/or power resources, among other examples) of the other devices and/or systems, not being timely identified, and therefore not being timely addressed. Consequently, the other devices and/or systems can continue to experience issues for a substantial period of time while the issues remain unidentified and unaddressed, which impacts a performance of the other devices and/or systems.

Some implementations described herein include an API aggregation system. The API aggregation system identifies a configuration file that defines an API aggregation pipeline, which includes a plurality of objects. Each object includes one or more elements, such as an API action element that identifies an API action (e.g., a representational state transfer (REST) API action, a simple object access protocol (SOAP) API action, or another type of API action) to be executed, a data transformation element that identifies a data transformation (e.g., a JQ transform, or another data transform) to be executed before or after execution of the API action, and/or a children element that identifies at least one child object of the object (e.g., when the object includes one or more child objects). Notably, one or more objects of the API aggregation pipeline may be configured to allow for dynamic generation and execution of additional API actions and/or data transformations, as further described herein.

The API aggregation system receives an API request that is associated with the API aggregation pipeline and therefore executes the API aggregation pipeline. In some implementations, when executing the API aggregation pipeline, the API aggregation system performs at least one dynamic operation. For example, the API aggregation system may perform a dynamic data transformation, a dynamic API action, or another type of operation that is not statically defined in the API aggregation pipeline, and that is generated as a result of executing the API aggregation pipeline (e.g., executing the plurality of objects of the API aggregation pipeline). In this way, the API aggregation system can communicate with one or more data sources in a dynamic manner (e.g., based on execution and responses of previous API actions and/or data transformations). The API aggregation system then provides an API result, such as to a user device (e.g., to permit the user device to present, via a GUI, such as a dashboard, information associated with the API result).

Accordingly, the API aggregation system enables dynamic diverse data aggregation from one or more data sources. Because the API aggregation system is dynamically configurable based on the API aggregation pipeline included in the configuration file, the API aggregation system is able to collect and provide data on the fly, and with minimal latency. For example, the API aggregation pipeline can create dynamic API actions and/or dynamic data transformations based on input (e.g., information included in the API request) and executing the plurality of objects of the API aggregation pipeline. Further, because of the generalized structure and format of the API aggregation pipeline, the API aggregation pipeline can be easily modified at any time to modify one or more objects included in the API aggregation pipeline without needing to perform additional coding or software updates.

Additionally, when a user device monitors other devices and/or systems and communicates with the API aggregation system to obtain information associated with monitoring the other devices and/or systems, the API aggregation system is able increase a likelihood that the user device identifies issues, such as issues that are associated with computing resources (e.g., processing resources, memory resources, communication resources, and/or power resources, among other examples) of the other devices and/or systems, in a more timely manner than using a static API aggregation approach. This increases a likelihood that the user device (or a user of the user device) timely addresses the issues, and therefore reduces an amount of time the other devices and/or systems experience the issues. Thus, the API aggregation system facilitates an improved performance of the other devices and/or systems.

FIGS. 1A-1D are diagrams of an example implementation 100 associated with dynamic diverse data aggregation. As shown in FIGS. 1A-1D, example implementation 100 includes an API aggregation system, a user device, and one or more data sources. These devices and systems are described in more detail below in connection with FIG. 2 and FIG. 3.

As shown in FIG. 1A, and by reference number 102, the API aggregation system may identify a configuration file. For example, another device, such as the user device, may send the configuration file to the API aggregation system, and the API aggregation system may receive the configuration file from the other device. The API aggregation system, based on receiving the configuration file, may therefore identify the configuration file.

In some implementations, the configuration file may define an API aggregation pipeline. The API aggregation pipeline may be a data structure and may include a plurality of objects. Each object may identify at least one of an API action (e.g., as further described herein) or one or more child objects. For example, as further shown in FIG. 1A, the API aggregation pipeline may be a data tree that includes a root object (labeled as "API Aggregation Pipeline"). As shown, the root object includes two child objects, Object 1 and Object 2. Object 1 includes two child objects Object 1_1 and Object 1_2, and Object 2 includes a single child object 2_1. Additional details related to the API aggregation pipeline are described herein in relation to FIG. 1B.

In some implementations, a user of the user device may interact with the user device (e.g., a user interface of the user device) to generate the configuration file and define the API aggregation pipeline within the configuration file. The user of the user device then may interact with the user device to cause the user device to send the configuration file to the API aggregation system. Alternatively, a device (e.g., the user device or another device) may generate (e.g., dynamically generate) the configuration file and may define the API aggregation pipeline by performing one or more operations (e.g., by executing one or more APIs, executing one or more data transformations, and/or one or more other operations). The device then may send the configuration file to the API aggregation system. Accordingly, the API aggregation system may receive the configuration file and thereby identify the configuration file (and the API aggregation pipeline include in the configuration file).

Figure 1B:
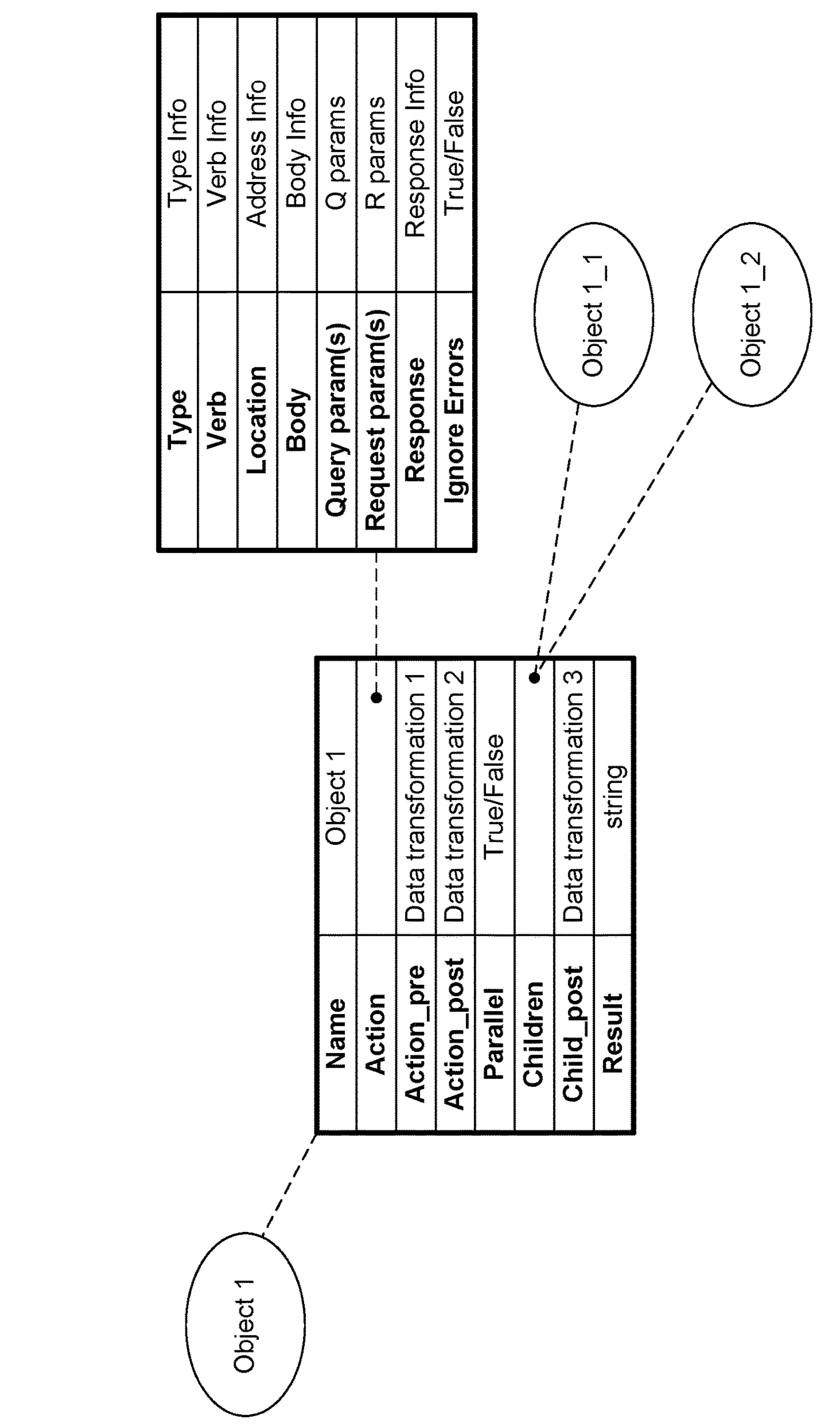

FIG. 1B shows additional details related to API aggregation pipeline. As shown in FIG. 1B, an object (e.g., the object 1 from the API aggregation pipeline shown in FIG. 1 A) may include one or more elements, such as a name element (e.g., that identifies a name of the object, shown as "Object 1"), an API action element (e.g., that identifies an API action, further described herein), a first data transformation element (e.g., that identifies a first data transformation that is to be executed before execution of the API action, shown as "data transformation 1"), a second data transformation element (e.g., that identifies a second data transformation that is to be executed after execution of the API action, shown as "data transformation 2"), a parallel execution element (e.g. that indicates, when the object includes a plurality of child objects, that the plurality of child objects are permitted to be, or not permitted to be, executed using a parallel execution process, shown as a "true/false" flag), a children element (e.g., that identifies, when the object includes one or more child objects, at least one child object of the object, shown as child objects "Object 1_1" and "Object 1_2"), a third data transformation element (e.g., that identifies a third data transformation that is to be executed after execution of the at least one child object identified by the children element, shown as "data transformation 3"), a result type element (e.g., that indicates a type of the result generated by executing the object, shown as "string"), and/or another element. A data transformation (e.g., the data transformation 1, the data transformation 2, or the data transformation 3) may include a JQ transform or other data transformation that can be executed to modify, filter, and/or restructure data.

As further shown in FIG. 1B, the API action element may indicate one or more of the following associated with the API action: a type of the API action (e.g., whether the API action is a REST API action, a SOAP API action, or another type of API action, shown as "type info"), a verb associated with the API action (e.g., a hypertext transfer protocol (HTTP) method, such as GET, POST, PUT, or DELETE, shown as "verb info"), a location associated with the API action (e.g., a uniform resource locator (URL) address, or another location identifier, shown as "address info"), a body of the API action (e.g., that indicates data or information that is provided as part of the API action, shown as "body info"), one or more query parameters associated with the API action (e.g., that are configured to modify a behavior of the API action when executed, shown as "Q params"), one or more request parameters associated with the API action (e.g., that are configured to provide additional information for execution of the API action, shown as "R params"), response information associated with the API action (e.g., that indicates a format, such as JavaScript object notation (JSON) or extensible markup language (XML), of the response generated by executing the API action, shown as "response info"), and/or ignore errors associated with API action (e.g., that indicates permission to ignore, or to not ignore, any error resulting from execution of the API action, shown as a "true/false" flag).

Figure 1C:
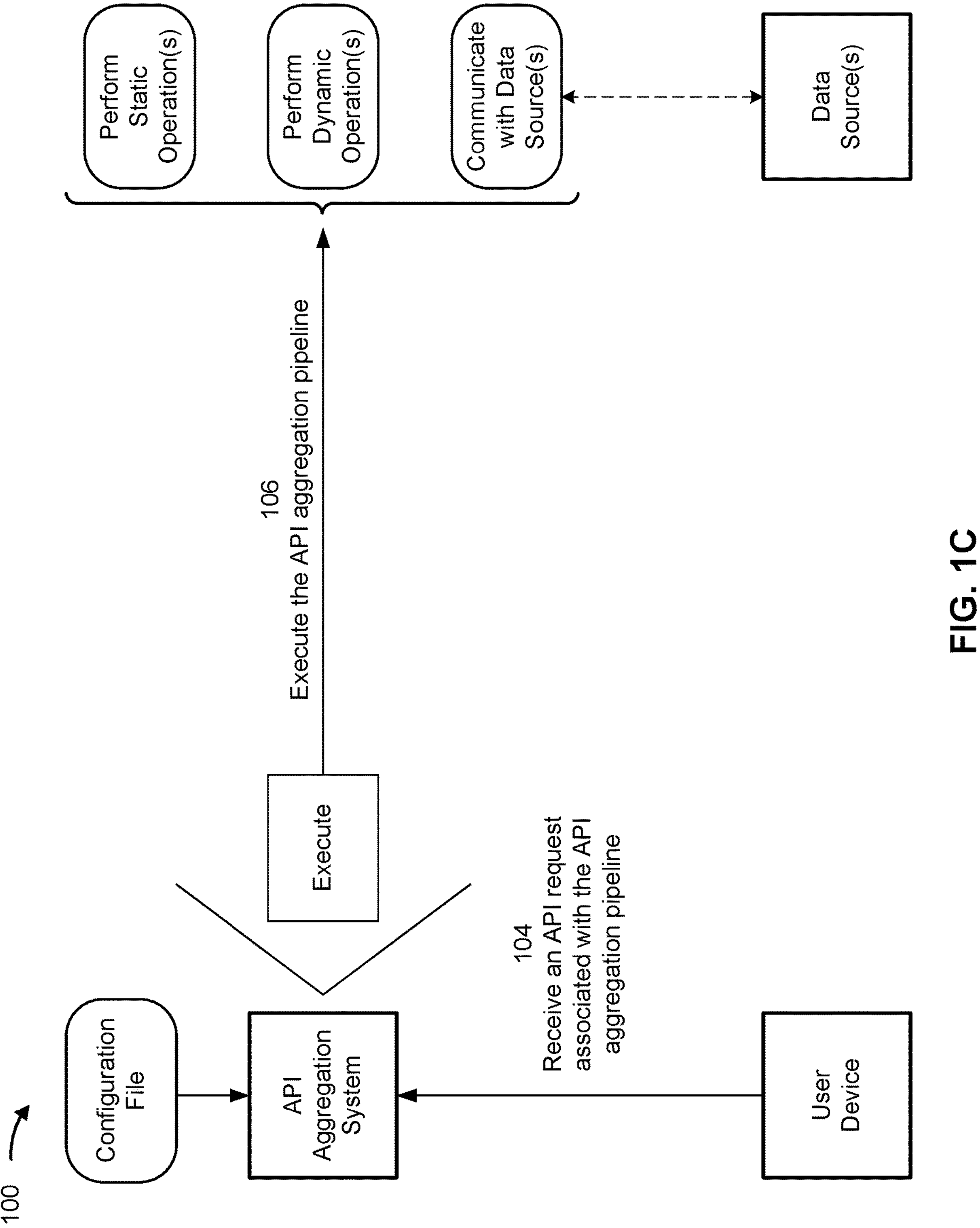

As shown in FIG. 1C, and by reference number 104, the API aggregation system may receive an API request. For example, the user device may send the API request to the API aggregation system, and the API aggregation system may thereby receive the API request. The API request may be, for example, a REST API request, a SOAP API request, or another type of API request.

In some implementations, the user device may generate and send the API request in association with the user device presenting a GUI. For example, the user device may provide a GUI (e.g., a dashboard, a portal, or another type of GUI) that requires information from the one or more data sources. The user device may therefore generate and send the API request to the API aggregation system. In some implementations, the API request may be associated with the API aggregation pipeline. That is, the API request may be formatted and/or include information to invoke execution of the API aggregation pipeline by the API aggregation system.

As shown by reference number 106, the API aggregation system may execute the API aggregation pipeline. In some implementations, the API aggregation system may execute the API aggregation pipeline by executing one or more objects of the API aggregation pipeline. For example, when the API aggregation pipeline is a data tree, the API aggregation system may traverse the API aggregation pipeline (e.g., using a depth-first traversal technique, or another traversal technique). To execute an object in the API aggregation pipeline (e.g., when traversing the API aggregation pipeline), the API aggregation system may execute the one or more elements included in the object. For example, the API aggregation system may execute an API action (e.g., identified by an API action element of the object), may execute (e.g., before execution of the API action) a first transformation (e.g., identified by a first data transformation element of the object), and/or may execute (e.g., after execution of the API action) a second transformation (e.g., identified by the second data transformation element of the object). When the object has one or more child objects, the API aggregation system may execute the one or more child objects (e.g., based on traversing the one or more child objects), serially or in parallel (e.g., indicated by a parallel execution element of the object), and may execute (e.g., after execution of the one or more child objects) a third data transformation (e.g., identified by the third data transformation element of the object of the object). In this way, execution of the object may generate a result (e.g., indicated by a result type element of the object).

Accordingly, as further shown in FIG. 1C, the API aggregation system (e.g., when executing the API aggregation pipeline) may perform at least one static operation, perform at least one dynamic operation, and/or may communicate with at least one data source. A static operation may include, for example, a data transformation, an API action, or another type of operation that is statically defined in the API aggregation pipeline. A dynamic operation may include, for example, a dynamic data transformation, a dynamic API action, or another type of operation that is not statically defined in the API aggregation pipeline, and that is generated as a result of executing the API aggregation pipeline. Accordingly, when performing an API action (e.g., either statically or dynamically), the API aggregation system may communicate with a data source (e.g., to send, receive, and/or modify information).

In some implementations, to perform a dynamic operation, the API aggregation system, when executing the API aggregation pipeline, may dynamically generate and/or dynamically execute a data transformation. For example, the API aggregation system may generate (e.g., dynamically generate), for an object, a data transformation, and may execute (e.g., dynamically execute) the data transformation. As a specific example, when the API aggregation system is executing an object of the API aggregation pipeline, the API aggregation system may execute a data transformation (e.g., as indicated by the first data transformation element, the second data transformation element, or the third data transformation element), which may cause the API aggregation system to generate (e.g., dynamically generate) a new data transformation and to execute (e.g., dynamically execute) the new data transformation.

In some implementations, to perform a dynamic operation, the API aggregation system, when executing the API aggregation pipeline, may dynamically generate and/or dynamically execute an API action. For example, the API aggregation system may generate (e.g., dynamically generate), for an object, a child object of the object, where the child object identifies an API action, and the API aggregation system may execute (e.g., dynamically execute) the API action (e.g., as part of executing the child object). As a specific example, when the API aggregation system is executing an object of the API aggregation pipeline, the API aggregation system may execute a data transformation (e.g., as indicated by the first data transformation element, the second data transformation element, or the third data transformation element), which may cause the API aggregation system to generate (e.g., dynamically generate) a child object, and the API aggregation system may execute (e.g., dynamically execute) an API action identified by the child object.

Figure 1D:
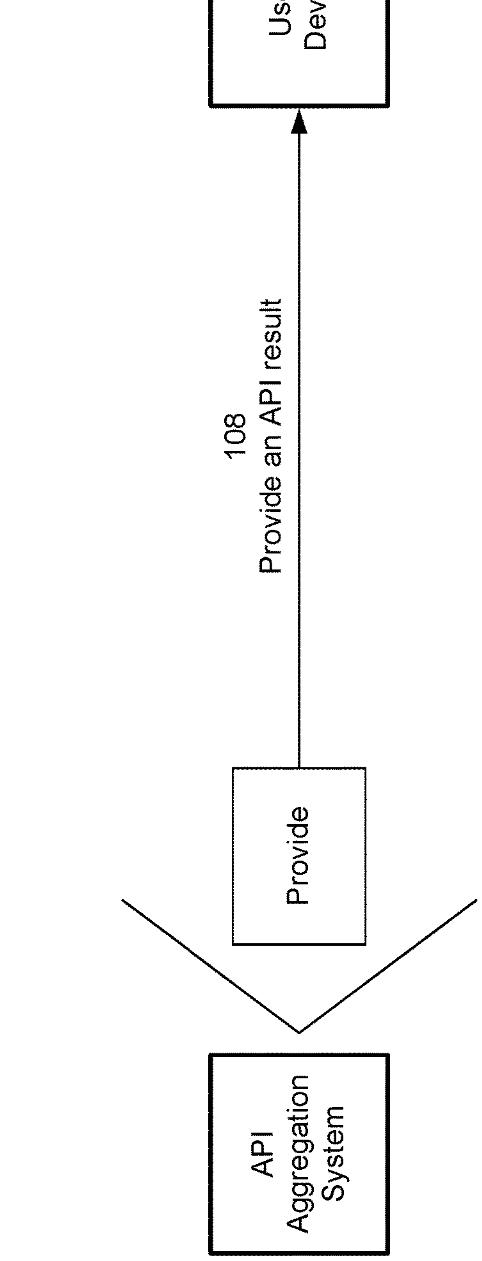

As shown in FIG. 1D, and by reference number 108, the API aggregation system may provide an API result. The API result may be a result of execution of the API aggregation pipeline (e.g., a result execution of the plurality of objects of the API aggregation pipeline). That is, executing the API aggregation pipeline may cause execution one or more API actions and/or one or more data transformations, and the API result may be an aggregated result of the execution of the one or more API actions and the one or more data transformations. The API result may be a REST API result (e.g., when the API request is a REST API request), a SOAP API result (e.g., when the API request is a SOAP API request), or another type of API result. The API result may include, for example, information obtained from the one or more data sources, information related to modifying data of the one or more data sources, and/or information related to communicating with the one or more data sources.

The API aggregation system may provide the API result by sending the API result to another device. For example, the API aggregation system may send the API result to the user device user device. This may permit the user device to present, via the GUI of the user device, information associated with the API result. For example, when the GUI is a dashboard, the user device may update and present, via the dashboard, information associated with the API result.

As indicated above, FIGS. 1A-1D are provided as an example. Other examples may differ from what is described with regard to FIGS. 1A-1D. The number and arrangement of devices and systems shown in FIGS. 1A-1D are provided as an example. In practice, there may be additional devices and systems, fewer devices and systems, different devices and systems, or differently arranged devices and systems than those shown in FIGS. 1A-1D. Furthermore, two or more devices and systems shown in FIGS. 1A-1D may be implemented within a single device or system, or a single device or system shown in FIGS. 1A-1D may be implemented as multiple, distributed devices and systems. Additionally, or alternatively, a set of devices and systems (e.g., one or more devices and systems) shown in FIGS. 1A-1D may perform one or more functions described as being performed by another set of devices and systems shown in FIGS. 1A-1D.

Figure 2:
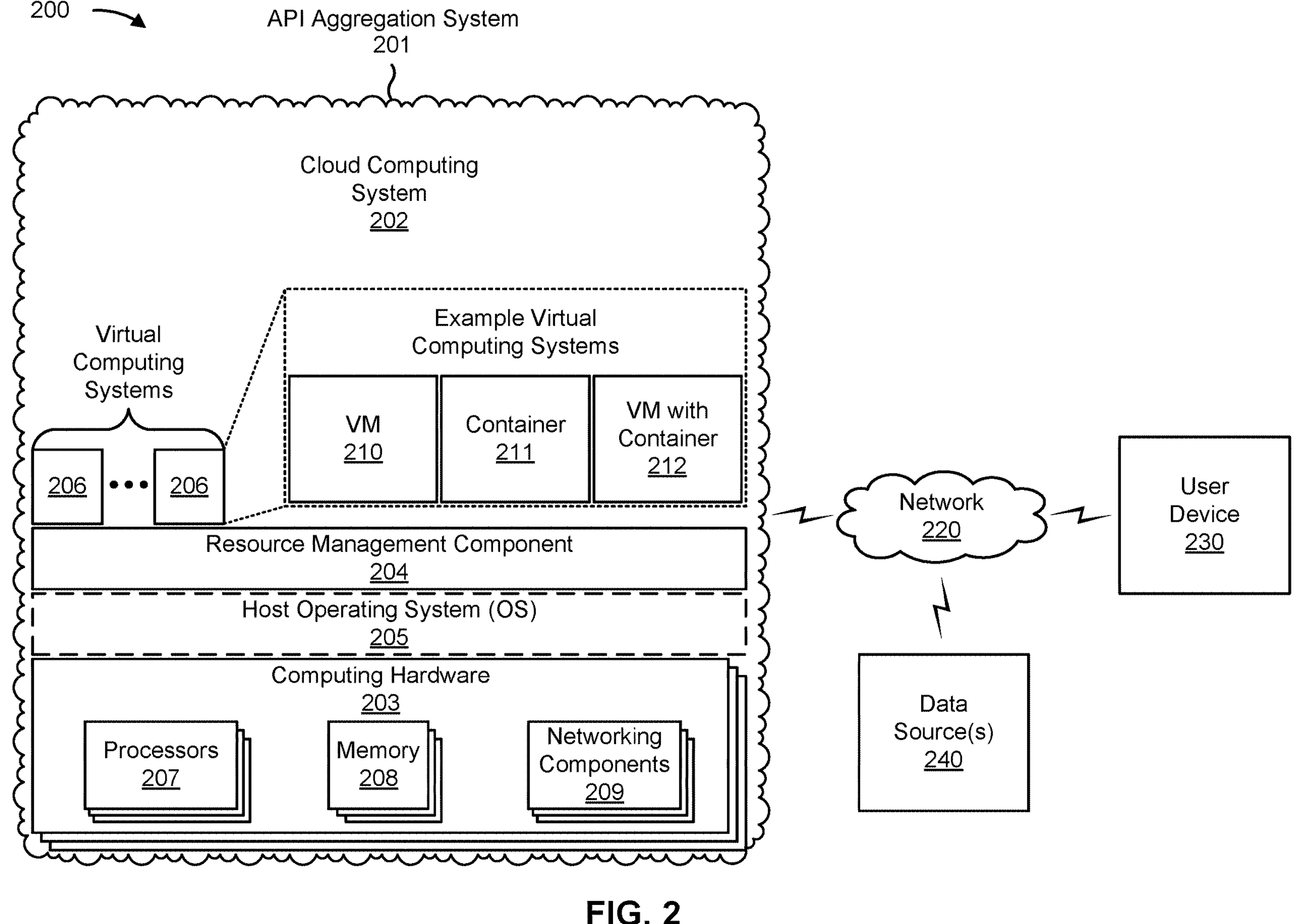
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an API aggregation system 201, which may include one or more elements of and/or may execute within a cloud computing system 202. The cloud computing system 202 may include one or more elements 203-212, as described in more detail below. As further shown in FIG. 2, environment 200 may include a network 220, user device 230, and/or one or more data sources 240. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the API aggregation system 201 may include one or more elements 203-212 of the cloud computing system 202, may execute within the cloud computing system 202, and/or may be hosted within the cloud computing system 202, in some implementations, the API aggregation system 201 may not be cloud-based (e.g., may be implemented outside of a cloud computing system) or may be partially cloud-based. For example, the API aggregation system 201 may include one or more devices that are not part of the cloud computing system 202, such as device 300 of FIG. 3, which may include a standalone server or another type of computing device. The API aggregation system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The user device 230 may include one or more devices capable of receiving, generating, storing, processing, and/or providing information (e.g., an API request and/or an API result), as described elsewhere herein. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The data source 240 may include one or more devices capable of receiving, generating, storing, processing, and/or providing information, as described elsewhere herein. The data source 240 may include a communication device and/or a computing device. For example, the data source 240 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 240 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
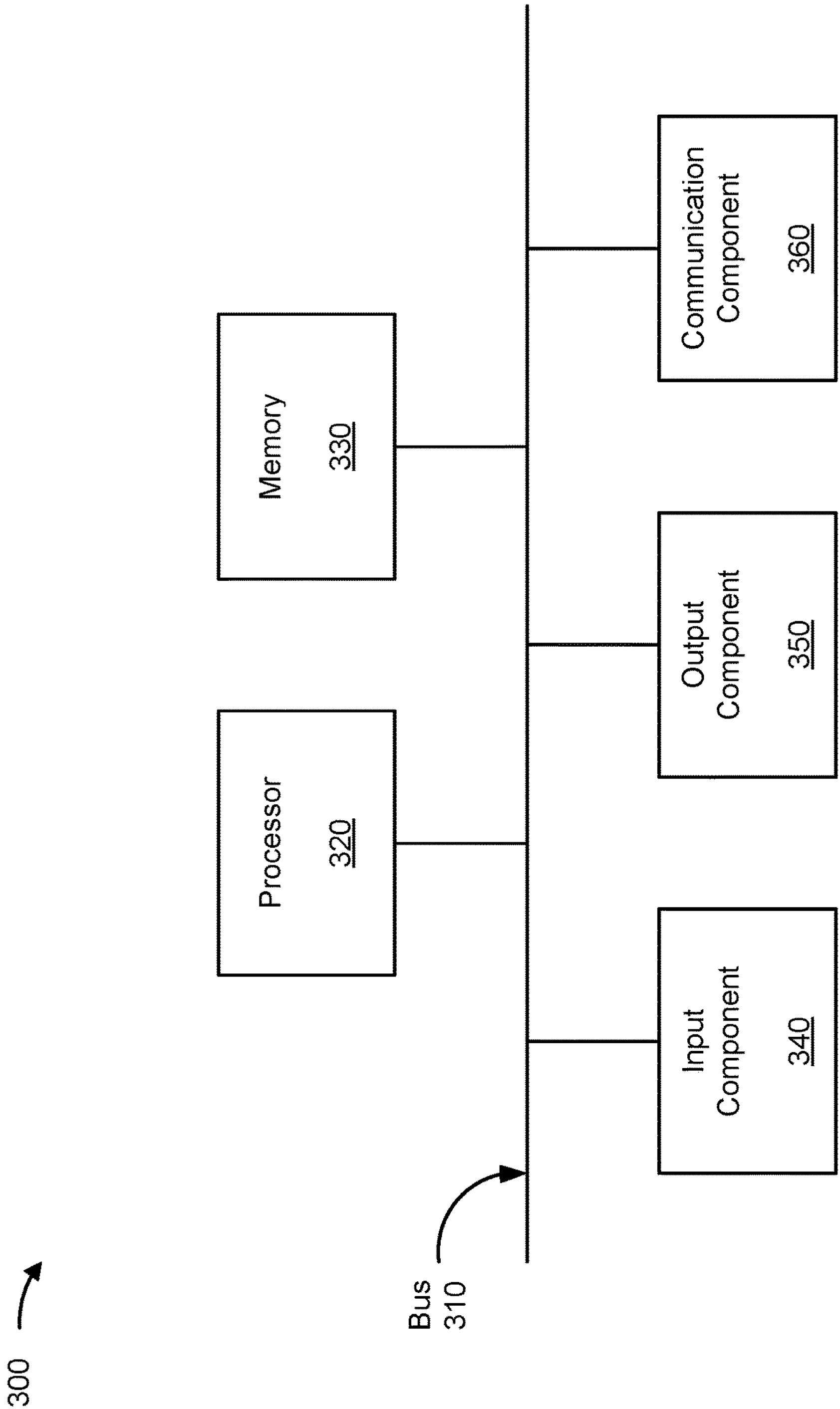
FIG. 3 is a diagram of example components of a device associated with dynamic diverse data aggregation.

FIG. 3 is a diagram of example components of a device 300 associated with dynamic diverse data aggregation. The device 300 may correspond to the API aggregation system 201, the computing hardware 203, the user device 230, and/or the data source 240. In some implementations, the API aggregation system 201, the computing hardware 203, the user device 230, and/or the data source 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
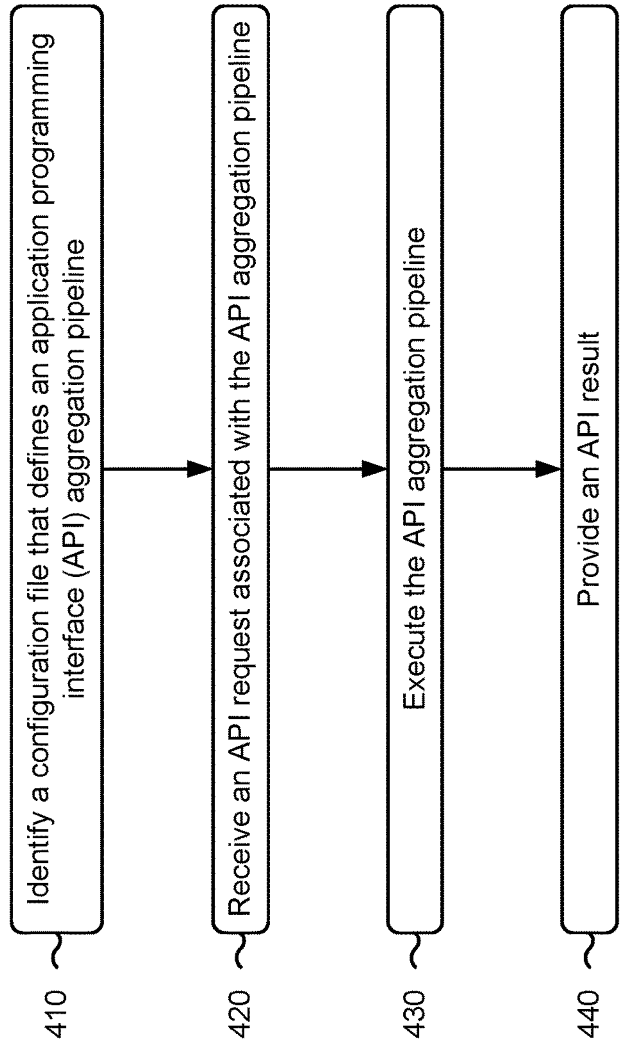
FIG. 4 is a flowchart of an example process associated with dynamic diverse data aggregation.

FIG. 4 is a flowchart of an example process 400 associated with dynamic diverse data aggregation. In some implementations, one or more process blocks of FIG. 4 are performed by a system (e.g., the API aggregation system 201). In some implementations, one or more process blocks of FIG. 4 are performed by another device or a group of devices separate from or including the system, such as computing hardware (e.g., the computing hardware 203), a user device (e.g., the user device 230), and/or a data source (e.g., the data source 240). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include identifying a configuration file that defines an API aggregation pipeline (block 410). For example, the system may identify a configuration file that defines an API aggregation pipeline, as described above. In some implementations, the API aggregation pipeline includes a plurality of objects. In some implementations, each object, of the plurality of objects, identifies at least one of an API action or one or more child objects.

As further shown in FIG. 4, process 400 may include receiving an API request associated with the API aggregation pipeline (block 420). For example, the system may receive, based on identifying the configuration file, an API request associated with the API aggregation pipeline, as described above.

As further shown in FIG. 4, process 400 may include executing the API aggregation pipeline (block 430). For example, the system may execute, based on the API request, the API aggregation pipeline, as described above. In some implementations, executing the API aggregation pipeline includes performing at least one dynamic operation.

As further shown in FIG. 4, process 400 may include providing an API result (block 440). For example, the system may provide, based on executing the API aggregation pipeline, an API result, as described above.

Process 400 may include additional implementations, such as any single implementation or any combination of implementations described below and/or in connection with one or more other processes described elsewhere herein.

In a first implementation, receiving the API request comprises receiving the API request from a user device, wherein the API request was generated and sent by the user device in association with the user device presenting a graphical user interface.

In a second implementation, alone or in combination with the first implementation, providing the API result comprises sending the API result to a user device to permit the user device to present, via a graphical user interface of the user device, information associated with the API result.

In a third implementation, alone or in combination with one or more of the first and second implementations, executing the API aggregation pipeline comprises at least one of dynamically generating, for an object, of the plurality of objects, a child object of the object, wherein the child object identifies a particular API action; and executing the particular API action.

In a fourth implementation, alone or in combination with one or more of the first through third implementations, executing the API aggregation pipeline comprises at least one of dynamically generating, for an object, of the plurality of objects, a data transformation, and executing the data transformation.

In a fifth implementation, alone or in combination with one or more of the first through fourth implementations, an object, of the plurality of objects, identifies a particular API action, and identifies at least one of a first data transformation that is to be executed before execution of the particular API action, or a second data transformation that is to be executed after execution of the particular API action.

In a sixth implementation, alone or in combination with one or more of the first through fifth implementations, an object, of the plurality of objects, identifies a plurality of child objects of the object, and indicates that the plurality of child objects are permitted to be executed using a parallel execution process.

In a seventh implementation, alone or in combination with one or more of the first through sixth implementations, an object, of the plurality of objects, identifies at least one child object of the object, and indicates a data transformation that is to be executed after execution of the at least one child object.

In an eighth implementation, alone or in combination with one or more of the first through seventh implementations, an object, of the plurality of objects, identifies a particular API action, wherein the particular API action indicates at least one of a type of the particular API action, a verb associated with the particular API action, a location associated with the particular API action, a body of the particular API action, one or more query parameters associated with the particular API action, one or more request parameters associated with the particular API action, or response information associated with the particular API action.

In a ninth implementation, alone or in combination with one or more of the first through eighth implementations, an object, of the plurality of objects, identifies a particular API action, wherein the particular API action indicates permission to ignore any error resulting from execution of the particular API action.

In a tenth implementation, alone or in combination with one or more of the first through ninth implementations, the API request is a REST API request and the API result is a REST API result.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

identifying, by a system, a configuration file that defines an application programming interface (API) aggregation pipeline, wherein the API aggregation pipeline includes a plurality of objects, and wherein each object, of the plurality of objects, identifies at least one of an API action or one or more child objects;

receiving, by the system and based on identifying the configuration file, an API request associated with the API aggregation pipeline;

executing, by the system and based on the API request, the API aggregation pipeline, wherein executing the API aggregation pipeline comprises:

performing at least one static operation defined in the API aggregation pipeline, and performing at least one dynamic operation that is not statically defined in the API aggregation pipeline and is generated as a result of executing the API aggregation pipeline; and providing, by the system and based on executing the API aggregation pipeline, an API result.

2. The method of claim 1, wherein receiving the API request comprises:

receiving the API request from a user device, wherein the API request was generated and sent by the user device in association with the user device presenting a graphical user interface.

3. The method of claim 1, wherein providing the API result comprises:

sending the API result to a user device to permit the user device to present, via a graphical user interface of the user device, information associated with the API result.

4. The method of claim 1, wherein performing the at least one dynamic operation comprises:

dynamically generating, for an object, of the plurality of objects, a child object of the object, wherein the child object identifies a particular API action; and executing the particular API action.

5. The method of claim 1, wherein performing the at least one dynamic operation comprises:

dynamically generating, for an object, of the plurality of objects, a data transformation; and executing the data transformation.

6. The method of claim 1, wherein an object, of the plurality of objects, identifies a particular API action, and identifies at least one of:

a first data transformation that is to be executed before execution of the particular API action; or a second data transformation that is to be executed after execution of the particular API action.

7. The method of claim 1, wherein an object, of the plurality of objects, identifies a plurality of child objects of the object, and indicates that the plurality of child objects are permitted to be executed using a parallel execution process.

8. The method of claim 1, wherein an object, of the plurality of objects, identifies at least one child object of the object, and indicates a data transformation that is to be executed after execution of the at least one child object.

9. The method of claim 1, wherein an object, of the plurality of objects, identifies a particular API action, wherein the particular API action indicates at least one of:

a type of the particular API action;

a verb associated with the particular API action;

a location associated with the particular API action;

a body of the particular API action;

one or more query parameters associated with the particular API action;

one or more request parameters associated with the particular API action; or response information associated with the particular API action.

10. The method of claim 1, wherein an object, of the plurality of objects, identifies a particular API action, wherein the particular API action indicates permission to ignore any error resulting from execution of the particular API action.

11. The method of claim 1, wherein the API request is a representational state transfer (REST) API request and the API result is a REST API result.

12. A non-transitory computer-readable medium storing a set of instructions, the set of instructions comprising:

one or more instructions that, when executed by one or more processors of a system, cause the system to:

receive an application programming interface (API) request associated with an API aggregation pipeline defined in a configuration file, wherein the API aggregation pipeline includes a plurality of objects, and wherein each object, of the plurality of objects, identifies at least one of an API action or one or more child objects;

execute, based on the API request, the API aggregation pipeline, wherein the one or more instructions, that cause the system to execute the API aggregation pipeline, cause the system to:

perform at least one static operation defined in the API aggregation pipeline, and perform at least one dynamic operation that is not statically defined in the API aggregation pipeline and is generated as a result of executing the API aggregation pipeline; and provide, based on executing the API aggregation pipeline, an API result.

13. The non-transitory computer-readable medium of claim 12, wherein the one or more instructions, that cause the system to perform that at least one dynamic operation, cause the system to:

dynamically generate and execute a particular API action.

14. The non-transitory computer-readable medium of claim 12, wherein the one or more instructions, that cause the system to perform the at least one dynamic operation, cause the system to:

dynamically generate and execute a data transformation.

15. The non-transitory computer-readable medium of claim 12, wherein an object, of the plurality of objects, identifies a particular API action, and identifies at least one of:

a first data transformation that is to be executed before execution of the particular API action; or a second data transformation that is to be executed after execution of the particular API action.

16. The non-transitory computer-readable medium of claim 12, wherein executing the API aggregation pipeline causes execution of at least one of one or more API actions or one or more data transformations, wherein the API result is an aggregated result of the execution of the at least one of one or more API actions or one or more data transformations.

17. A system, comprising:

one or more memories; and one or more processors to:

identify a configuration file that defines an application programming interface (API) aggregation pipeline, wherein the API aggregation pipeline includes a plurality of objects;

receive, based on identifying the configuration file, an API request associated with the API aggregation pipeline;

execute, based on the API request, the API aggregation pipeline, wherein the one or more processors, to execute the API aggregation pipeline, are to:

perform at least one static operation defined in the API aggregation pipeline, and perform at least one dynamic operation that is not statically defined in the API aggregation pipeline and is generated as a result of executing the API aggregation pipeline; and provide, based on executing the API aggregation pipeline, an API result.

18. The system of claim 17, wherein the one or more processors, to perform the at least one dynamic operation, are to:

dynamically execute a particular API action.

19. The system of claim 17, wherein the one or more processors, perform the at least one dynamic operation, are to:

dynamically execute a data transformation.

20. The system of claim 17, wherein providing the API result permits information associated with the API result to be presented via a graphical user interface of a user device.

* * * * *